Patented Mar. 2, 1926.

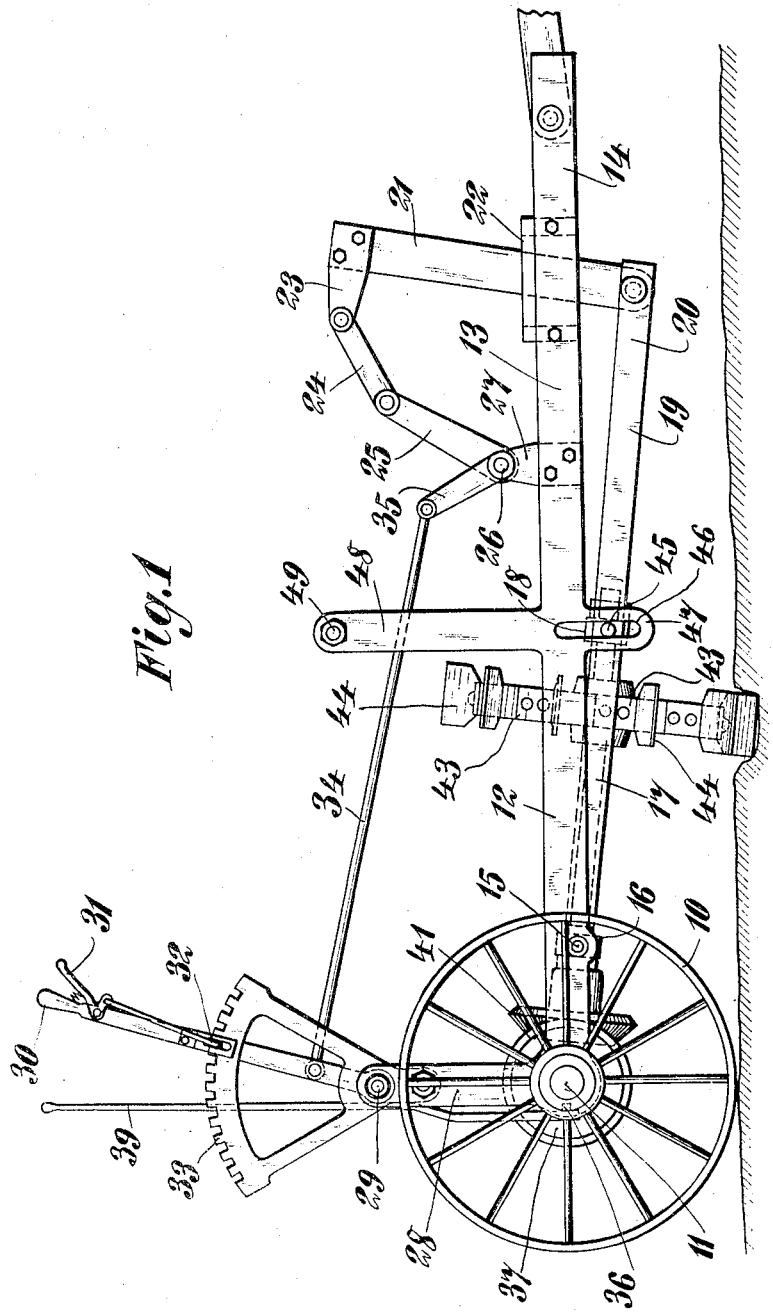

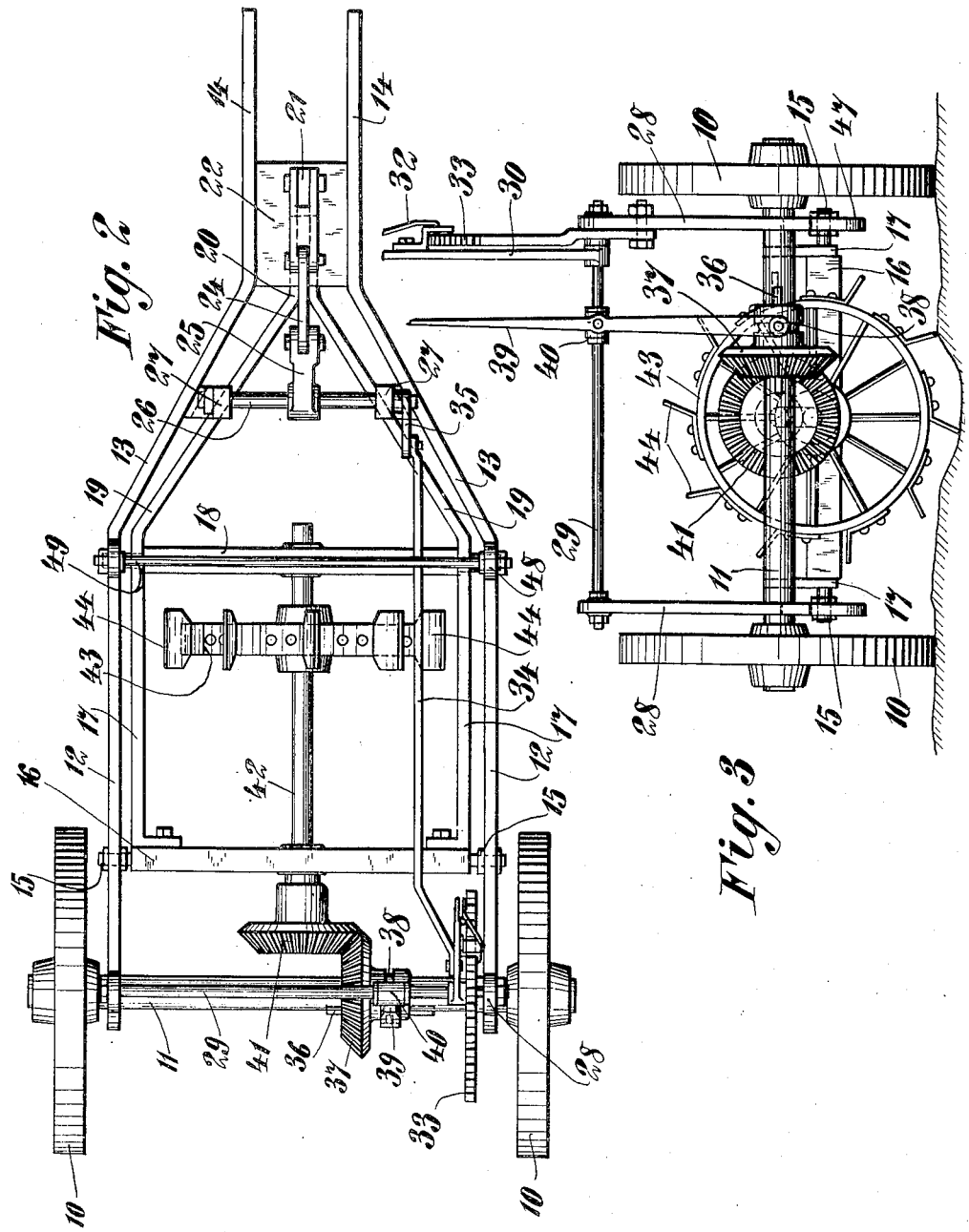

1,574,967

UNITED STATES PATENT OFFICE.

FRANK HAJOSI, OF VICTORIA, TEXAS.

PLANT-TOPPING MACHINE.

Application filed June 3, 1925. Serial No. 34,688.

*To all whom it may concern:*

Be it known that I, FRANK HAJOSI, a citizen of the United States, residing at Victoria, in the county of Victoria and State of Texas, have invented certain new and useful Improvements in Plant-Topping Machines, of which the following is a specification.

This invention relates to agricultural implements and particularly to devices for cutting or chopping the tops of growing plants, as cotton, beets, etc.

One of the objects of the invention is to provide a farm implement, horse drawn or otherwise, that may be moved over rows of growing plants and provided with a revolving cutter head for severing the leaves and upper portions thereof in a rapid and effective manner.

Another purpose is to provide means whereby the cutter head may be adjusted relative to the surface of the ground to cut away any desired portion of the plants.

It is a further aim to provide a cutter head having a plurality of knives so arranged as to be easily sharpened and capable of removal and substitution in the event of their being damaged.

These and other like objects, such as simplicity, durability and cheapness of construction are attained by the novel design, arrangement and combination of parts hereinafter described and shown in the accompanying drawings, forming a material part of this disclosure, and in which:—

Figure 1 is a side elevational view of an embodiment of the invention, as assembled ready for use.

Figure 2 is a top plan view thereof.

Figure 3 is a rear elevational view of the same.

The implement as shown is provided with a pair of spaced rear wheels 10, of the usual wide rim type, and are securely fixed on an axle 11.

Mounted on the axle, adjacent the wheel hubs, are the side elements of a rigid frame 12, converging forwardly at 13 and terminating in parallel members 14 to which the usual haulage connections are made.

At points in advance of the axle, the frame sides 12 are provided with bearings 15 in which are pivotally mounted the ends of a cross bar 16, the same being one of the members of an inner frame 17, the parallel sides of which are held in fixed relation by a cross bar 18.

Converging extensions 19 of the frame are brought into adjacent relation at their ends 20 and have pivotally secured between them an upright bar 21, extending slidably through a guide block 22 fixed between the outer frame elements 14.

The bar 21 has rearwardly extending plates 23 at its upper end, between which is pivoted a link 24, in turn pivoted to a lever 25 rigid on a transverse rock shaft 26 rotatable in bearings 27 secured on the inner sides of the converging frame elements 13.

Arms 28 extend integrally above the frame sides 12 over the axle and mounted in the upper ends of the arms is a spindle 29 on which is fulcrumed a hand lever 30 provided with a detent handle 31 actuating a stop 32 engageable selectively in any of the notches in a segment 33, the same being rigidly bolted to the adjacent frame arm.

Pivotally connected with the lever 30 is a link rod 34, the same being pivoted at its front end to a lever 35 fixed on a shaft 36 in such manner as to raise and lower the inner frame by its intervening connections upon operation of the lever 30, in a manner which will be readily understood.

Set in the axle 11 is a key driving a bevel gear 37 mounted on the axle and shiftable therealong by reason of an annularly recessed hub 38 in which is engaged a fork formed at the end of a lever 39 pivoted on a sleeve 40 journalled on the spindle 29 and extending adjacent the lever 30.

A mating gear 41, meshing with the gear 37, is fixed on the rear end of a longitudinally extending shaft 42 journalled in bearings carried by the cross bars 16 and 18 and having secured upon it the hub of a wheel 43 provided with angularly extending cutter blades 44 the width of which is greater than the wheel 43.

It will now be seen that the cutter head or wheel rotates in a plane transverse to the direction of the implement, the motion of the wheel being controlled by the lever 39 in engaging or disengaging with the driving gear on the axle.

It will be further obvious that the inner frame, and thus the cutter head may be raised or lowered relative to the surface of the ground, and retained in any desired adjustment by the lever 30.

In order to further support and guide the inner frame and cutter head, pins 45, fixed in the inner frame sides 17, extending into slots 46 in extensions 47 of the outer frame sides 12, these slots limiting the range of the relative adjustment of the frames.

Above the extensions 47 are raised arms 48 integral with the frame sides 12, these extensions being firmly held in relation by a rod 49 extending therebetween.

Having thus described my invention and set forth the manner of its construction and application, what I claim as new and desire to secure by Letters Patent, is:—

1. A plant topping implement comprising a frame having an axle and a pair of wheels at the rear, an inner frame pivoted within the first frame at a point in advance of the axle, means for adjusting the relative height of said frames, said means retaining their adjustment, means for guiding and limiting the movement of said inner frame; a shaft journalled lengthwise in the inner frame, a bevel gear fixed on said shaft, a mating gear keyed to slide on said axle, means to engage and disengage said gears, and a cutter head on said shaft having angularly disposed peripheral blades.

2. A plant topping implement comprising a rigid outer frame, an axle on which said frame is journalled at its rear extremity, wheels fixed at the ends of said axle, an inner frame pivoted within the outer frame at a point in advance of said axle, said frames having interengaging elements, means at the rear of the outer frame for adjusting the planes of the frames, means for limiting the amount of adjustment, means for maintaining the adjustment, a shaft mounted longitudinally in the inner frame centrally thereof, means on said axle to transmit motion to the shaft, and a cutter head fixed on said shaft.

In witness whereof I have affixed my signature.

FRANK HAJOSI.